United States Patent [19]

Dickman et al.

[11] Patent Number: 5,323,452
[45] Date of Patent: Jun. 21, 1994

[54] VISUAL PROGRAMMING OF TELEPHONE NETWORK CALL PROCESSING LOGIC

[75] Inventors: Bernard N. Dickman, Middletown; Nancy E. Mond, East Brunswick; Arunkumar R. Patel, Sommerset, all of N.J.

[73] Assignee: Bell Communications Research, Inc., Livingston, N.J.

[21] Appl. No.: 629,372

[22] Filed: Dec. 18, 1990

[51] Int. Cl.$^5$ .................. H04M 3/42; H04M 3/00
[52] U.S. Cl. ................................ 379/201; 379/207; 379/269; 379/284
[58] Field of Search ............ 379/201, 207, 96, 93, 379/94, 204, 269, 284, 396; 364/200, 300; 395/159, 160, 161, 500

[56] References Cited

U.S. PATENT DOCUMENTS

| 4,653,090 | 3/1987 | Hayden | 379/204 |
|---|---|---|---|
| 4,695,977 | 9/1987 | Hansen et al. | 379/201 X |
| 4,782,517 | 11/1988 | Bernadis et al. | 379/201 |
| 4,785,408 | 11/1988 | Britton et al. | 364/300 |
| 4,878,240 | 10/1989 | Lin et al. | 379/67 |

OTHER PUBLICATIONS

"Business Services Database (BSDB): A Service Control Point (SCP) Application Designed to Support Private Virtual Network (PVN) Services," Technical Advisory TA-TSY-000460, Issue 2, Feb. 1988, Bell Communications Research, Inc.

Ljungblom, "A Service Management System for the IN", Ericsson Review No. 1, 1990, pp. 32-41.

Primary Examiner—James L. Dwyer
Assistant Examiner—Harry S. Hong
Attorney, Agent, or Firm—Leonard Charles Suchyta; Joseph Giordano

[57] ABSTRACT

A system and method for creating and modifying intelligent telephone network call processing logic trees which can be customized for individual customers and created in a user-friendly visual environment (10, 15, FIG. 3-5). Service primitives are defined as logical graph nodes (20, FIG. 2, FIG. 3) which can be visually assembled into logic trees (FIG. 5) which represent the service logic flow and which provide default values for all service options. Higher level nodes, assembled from a plurality of service primitives, can likewise be defined and stored (12, 13, 19) for later use as entities in defining yet further call processing logic trees. These call processing logic trees are interpreted to allow the service control point computers (17) to implement the services in the switched telephone network (18) by sequentially executing the specified call processing primitives. A library (12, 13, 19) of defined nodes and defined node assemblies which represent service features can thus be made available to permit graphical manipulation into complete logic trees representing new services. These logic trees are then interpreted by generic programs in the service control point to actually provide the described services.

17 Claims, 4 Drawing Sheets

FIG. 3
NODE DEFINITION

[LOAD] [VALIDATE] [STORE] [DELETE]  [BROWSE] [HELP] [QUIT]

NODE NAME: QUEUE

NODE TYPE: ⊃ ASSIGNMENT ACTION

DATA TYPE: ⊃ TEXT

NODE RULES: "(LIFO/FIFO)"

OTHER ALLOWED: ⊃ NO

NODE ERR MSG: VALID VALUES FOR QUEUE ARE  LIFO OR FIFO

NOTES: QUEUE ASSIGNMENT ACTION NODE

NODE DEFINITION LOADED

— 30

FIG. 4
SERVICE DEFINITION

| ANNOUN | COLLDIG | DIGENT |
|---|---|---|
| ⌞41 | ⌞42 | ⌞43 |
| AGTGRP | TIME | QUEUE |
| ⌞44 | ⌞45 | ⌞46 |

SERVICE: NACD
QUALIFIER: BANJ1

RECORD COMMANDS
[LOAD]  [VALIDATE]  [STORE]

CANVAS COMMANDS
[CLEAR]  [DRAW]  [HELP]
[QUIT]

CURRENT MODE: QUEUE

[ADD]  [VIEW]  [DELETE]

— 40

VISUAL PROGRAMMING OF TELEPHONE NETWORK CALL PROCESSING LOGIC

TECHNICAL FIELD

This invention relates to the creation and the provisioning of special customized telephone network services for telephone subscribers and, more particularly, to a portable, visually programmed call processing logic interface for creating and provisioning such customized services.

BACKGROUND OF THE INVENTION

New telephone services are continually being developed by telephone service providers in order to meet the needs of their customers. As such services become available, the telephone companies, subscribers and the users seek yet further improvements in these services. Special services such as 800 service, 900 service, and Private Virtual Networks (PVN) are only a few of the possible services being offered. Other services might well be conceived and might well find extensive use. Unfortunately, however, new telephone services have heretofore required long and expensive design, testing and deployment activities. Such special telecommunications services are typically provided in the public telephone network by computer program call processing sequences residing in digital switches. A typical approach to providing such special services is the introduction into the telephone network of a service implementing network element which interacts with the telephone network so as to implement the telephone services. Such service implementing network elements are variously called Service Adjuncts (SAs), Service Switching Points (SSPs) and Service Control Points (SCPs). One such Service Adjunct is disclosed in S. M. Lin and J. F. Rizzo U.S. Pat. No. 4,878,240, granted Oct. 31, 1989. A typical Service Switching Point is disclosed in J. J. Bernardis U.S. Pat. No. 4,782,517, granted Nov. 1, 1988. Finally, a typical Service Control Point is disclosed in J. O. Boese et al. application Ser. No. 453,042, filed Dec. 12, 1989. Each such service implementing network element is equipped with a set of software-implemented service primitives which can be combined in various ways to implement a number of telephone services. A set of such primitives for a Service Adjunct is disclosed in the above-mentioned Lin et al. patent. Another set of primitives for a Service Switching Point is disclosed in the above-mentioned Bernardis et al. patent. Yet another set of such primitives for a Service Control Point is disclosed in "Business Services Database (BSDB): A Service Control Point (SCP) Application Designed to Support Private Virtual Network (PVN) Service, "Technical Advisory TA-TSY-000460, Issue 2, February 1988, published by Bell Communications Research, Inc., Red Bank, N.J. All of these sets of service-implementing primitives are, as a group, generally equivalent, although each is implemented in a slightly different way.

A telecommunications network including such programmable special service implementing components is called an "intelligent network." Such networks make it possible to offer useful and profitable new services such as 800 service, Alternate Billing service and Private Virtual Network service. Intelligent Network Call Processing Logic (INCPL) is the name given to the software that "stitches together" the appropriate service primitives to enable the Intelligent Network mechanism to implement and customize such services without the need for new switch software or hardware. Currently, this INCPL is custom-developed for each new service by a service designer, usually associated with the service provider, installed in the intelligent network service implementing component and supported by a service management system for that service. Thus, instead of the software to support a new service coming from a switch vendor, it can now come from a service vendor, making it possible to reduce the interval between service concept and service offering. Unfortunately, a great deal of time is still required to design custom and implement each new service. Moreover, since such service designs are not highly portable, further delays arise due to the need to provide widely distributed software elements to support the new service in a wide variety of different environments.

SUMMARY OF THE INVENTION

In accordance with the illustrative embodiment of the present invention, these and other problems are overcome by providing a user-friendly environment in which intelligent network service primitives can be assembled into telephone services utilizing the graphic capabilities of a computer workstation. If a complete telephone service is analyzed as a graph consisting of nodes and edges, the nodes represent the intelligent network service primitives executable by the service implementing components and the edges represent the order of execution of these primitives. Both action nodes and decision nodes can be defined in terms of the available service primitives and stored for later use in designing a new telephone service. Moreover, with this representation, the new telephone service can be displayed as a "tree" of such node. Such a tree display can be manipulated graphically to create and alter the logic of a service. An interpretor program, designed for a particular service implementing component, implements such display representations with the available adjunct service primitives. In accordance with this invention, telephone services can be created, manipulated and altered by simple, user-friendly graphical manipulation. Not only can intelligent network service primitives be assembled graphically into new services, but service features can be defined as assemblies of such intelligent network service primitives and, once designed, stored in a library as a single node to be invoked and reused as a single entity in designing a plurality of future services.

More particularly, graphical images or icons on a display screen are used to represent a reusable library of user-defined telephone service primitives. These images or icons can be manipulated graphically so as to assemble the images into logical trees representing new services or new service features. Once fully assembled, the electronic representation of the graphical service tree or service feature tree can be interpreted so as to actually implement the service or service feature. In this way, new telephone services can be designed and implemented much more quickly than in the prior art and thus save much of the expense previously associated with telephone service design and deployment. In addition, the extremely high level representation of telephone services implicit in the graphical service trees is an extremely portable mechanism for quickly and easily deploying such services without extensive reworking of service implementing code. Indeed, the simplicity, speed and flexiblity of telephone service design and implementation provided with the present invention can be exploited to allow each individual telephone user to custom design telephone services exactly matching the needs of the customer.

The present invention makes possible dynamic graphical creation, customization and provisioning of new call processing services. Using both simple nodes, hereinto called primitive nodes and consisting of, primitives and complex nodes that are user-defined constructed nodes and are called user defined service feature nodes, new services can be defined rapidly and with great ease. A new service is created visually as a logic tree with nodes defined to represent a high-level abstraction of the primitive call processing actions or call processing decision points or combinations of such primitive actions and decision points. This tree, or the electronic representation of the tree, is called a Call Processing Record (CPR) since it defines exhaustively the processing necessary to provide an individual call with the defined service. Service providers, as well as subscribers themselves, can customize and provision the graphically defined service to satisfy specific customer needs by dynamically modifying and parameterizing the relevant graphical call processing record trees. The thus provisioned call processing records representing the service can then be translated from the user-friendly visual format to a rigorous program-generating format which can be generically interpreted by existing service implementing components. The distribution and installation of such call processing records to appropriate service implementing components in an intelligent network enables the thus-described service to become instantly available to telephone subscribers.

There are three steps in this service specification process: 1) defining the nodes, 2) establishing which nodes can be used in a particular service, and, 3) creating call processing records defining a particular service using the nodes that have been defined, and to which can be added the customer-specific parameters necessary to completely specify the service. These three steps can be iterated interactively to improve the quality of the resulting service, to remove "bugs," or to provide new features and capabilities.

Other aspects of a service creation and provisioning system are disclosed and claimed in the copending applications of D. L. Babson, J. A. Bajzath, Jr. and T. C. Ely, Ser. Nos. 629,371, 629,389, 629,390 and 629,447, all filed of even date herewith and assigned to applicants' assignee.

BRIEF DESCRIPTION OF THE DRAWINGS

A complete understanding of the present invention may be gained by considering the following detailed description in conjunction with the accompanying drawings, in which:

FIG. 3 is a graphical representation of a display screen used to define new telephone service primitives in the system of FIG. 1;

FIG. 4 is a graphical representation of a display screen used to define the allowable subset of telephone service nodes which are used to design and implement a particular advanced telephone service in the system of FIG. 1.

To facilitate reader understanding, identical reference numerals are used to designate elements common to the figures.

DETAILED DESCRIPTION

Figure 1:
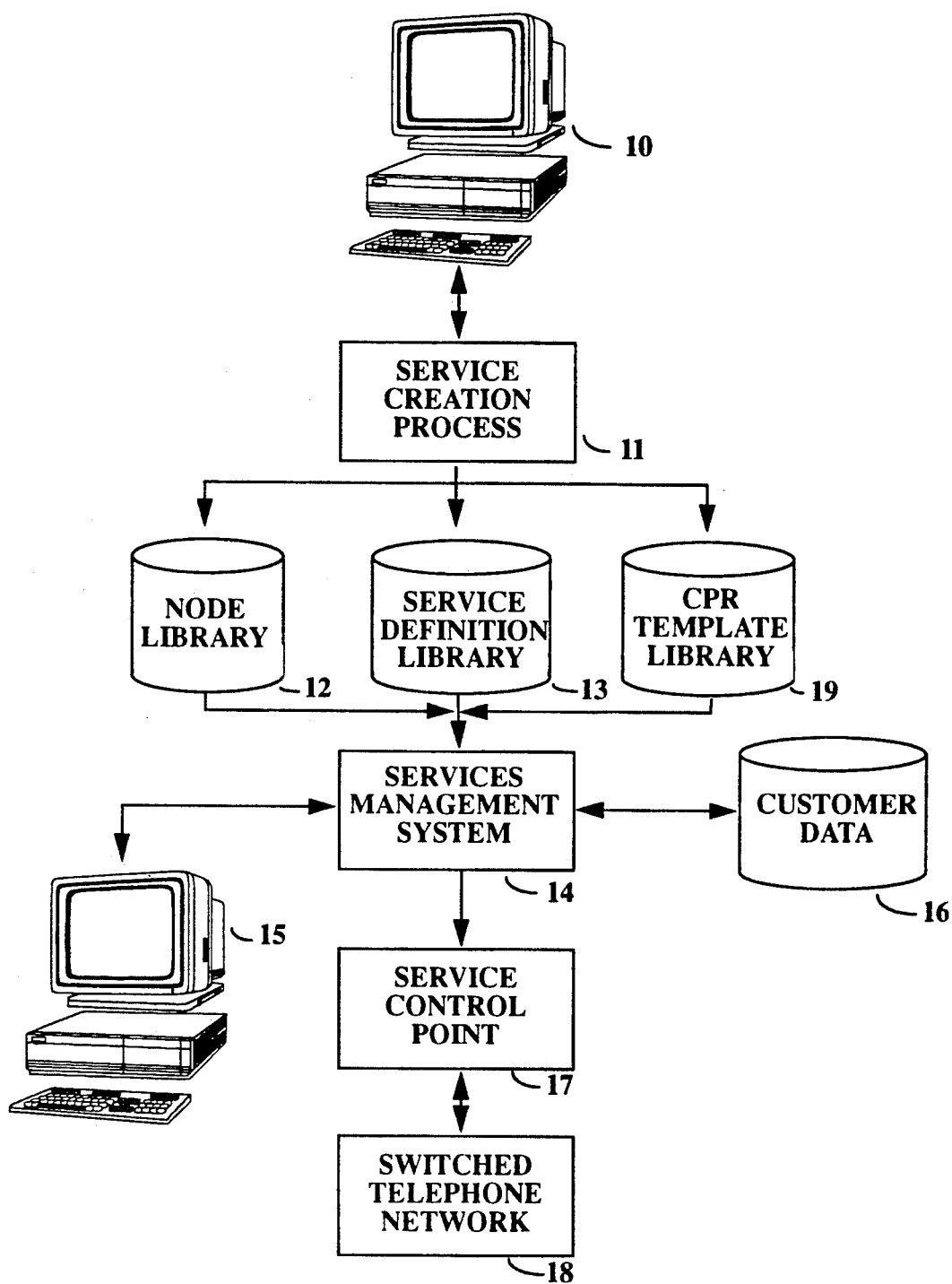
FIG. 1/shows a block diagram of an intelligent telephone network including a graphical telephone service design and deployment system in accordance with the present invention.

Referring more particularly to FIG. 1 of the drawings, there is shown a general block diagram of an intelligent network telephone service design and deployment system comprising a workstation 10 for designing new telephone services in accordance with the present invention. As will be described hereinafter, workstation 10 includes graphical facilities for defining customer special service nodes in terms of service control point primitives, bounding new special services in terms of the thus defined nodes which can be used for that service, and assembling these telephone service nodes into templates or assemblies of call processing logic units capable of providing the new telephone special services. Service creation process 11 provides the software for supporting these facilities and includes standard window processing capability as well as mouse or other visual selection apparatus support, and is typically stored in the program memory of workstation 10. Storage device 12 stores a library of the electronic representations of all of the nodes previously specified, both simple primitive nodes and more complex, user-defined service feature nodes. Storage device 13 stores the definitions of all of the services defined at workstation 10, where a service definition is simply the specification of which of the defined nodes (primitives) can be used to implement a particular service. Storage device 19 stores templates of multinode fully designed services as call processing records. In the present application, a "template" is a fully designed service, but without all of the variable parameters which are dependent on the actual customer using the service. Although shown as separate storage devices, stores 12, 13 and 19 can be contained in a single storage device.

The present invention contemplates three steps in creating new services, defining graphical nodes from which services can be assembled (node definition), prescribing which nodes can be used in a particular service (service definition) and prescribing the logical interrelationships of the various nodes necessary to produce the desired service (call processing record creation). As new nodes are defined, they are stored in node library 12 for later retrieval and reuse. Once a new service is fully defined in terms of primitive or complex service nodes, a representation of that service definition is stored in a service definition storage facility 13. Once the service nodes are assembled into a service logic tree or template, that template is stored as a call processing record (CPR) in call processing record template library 19. The templates in library 19 require only the specification of certain customer-dependent variables required to fully implement the service for a particular customer.

A services management system 14 provides administrative control over a plurality of service control points such as service control point 17 which actually implement the new services by exchanging network control messages with the switched telephone network 18. The details of the service control point 17, along with its interaction with the switched telephone network 18, are detailed in the aforementioned copending application of J. O. Boese et al. Since the structure and operation of the service control point 17 and the switched telephone system 18 comprise well-known telephone facilities, they will not be further described here. Sufficient to note that these elements are able to implement telephone network service primitives which can be utilized to realize telephone services and which are similar or identical to those disclosed in the aforementioned J. J. Bernardis and S. M. Lin patents and BSDB publication.

Associated with the services management system 14 is a customer data base 16 which contains detailed information concerning the customers utilizing telephone network 18. Also associated with services management system 14 is a further computer workstation 15 which can be used to add customer preferences and other customer specific data to the call processing record templates defined in store 19. This addition of the customer specific data to a call processing record template is called "service provisioning" and permits the service templates passed to service control point 17 to be customized for a particular customer or set of customers using network 18. Workstation 15 can, of course, be combined with workstation 10 if the two workstations are at the same location.

The workstations 10 and 15 can be any modern workstation supporting graphical manipulation capability. One such workstation is the SUN 3/160 terminal running under the SUN operating system and using the SUNVIEW ® graphics environment. This environment provides window support, mouse control, and graphic creation and manipulation capability adequate to implement the present invention. Many other modern workstations, however, would likewise support implementations of the present invention.

Figure 2:
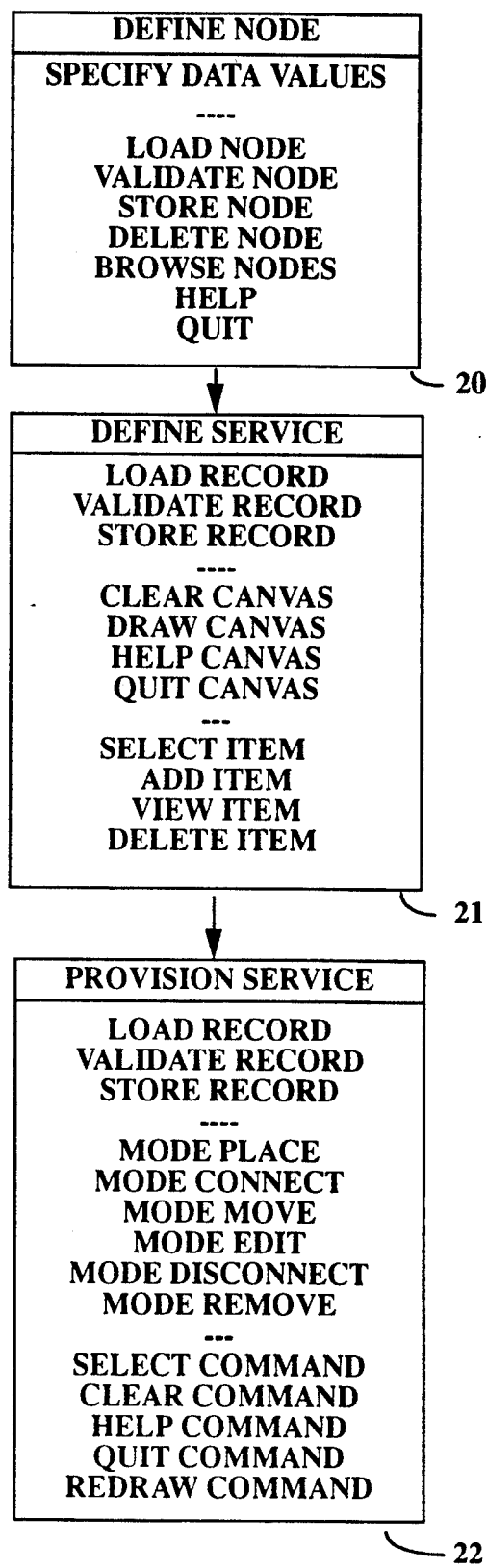
FIG. 2 shows a flowchart of the service definition, provisioning and implementation processes taking place in the system of FIG. 1.

The present invention will be better understood by considering the flowchart of FIG. 2. In FIG. 2 there is shown a flowchart of the process for designing and deploying new services for telephone subscribers in accordance with the present invention. Three major steps are involved, node definition, service definition and call processing record creation. These steps will be taken up individually below.

The intended user of the process of FIG. 2 is the service creator, typically the telephone service provider. As suggested in box 20 of FIG. 2, this person must create the nodes to be used in new services. The new nodes are created dynamically by specifying the following properties of the new node.

1. Node Name
2. Node Type
3. Data Type
4. Node Rules
5. "Other" Allowed
6. Node Error Message
7. Notes As is shown in detail in FIG. 3, a node definition screen can be used to capture the node properties as data items. The "Load," "Validate," "Store," "Delete," "Browse," "Help," and "Quit" command buttons are utilized to access and process nodes as entities. The data acquisition fields are used to define new nodes by specifying the node name and the node properties. Using these properties, a node can be administered by the service management system 14 of FIG. 1 and implemented by the service control point 17 of FIG. 1 without the necessity of writing new service implementing code. As illustrated in FIG. 3, the user is presented with an on-screen form which requires that the user specify the values for each of these properties. The cursor initially is located at the first data field (NODE NAME:) and advances to successive data fields as the <enter> or <return> key is depressed. Once these properties have been specified, the user can store the completed node definition for the newly created node in a node library in store 12 (FIG. 1), using the command keys identified in the top portion of the screen display of FIG. 3.

The properties captured by the node definition screen of FIG. 3 contain key information about the new node and, when necessary, can be translated and sent to the service control point 17 of FIG. 1 to drive a generic Call Processing Record (CPR) interpreter (such as that disclosed in the aforementioned Bernardis patent), so that it can support the use of this new node in any call processing records that are created and provisioned for services. Additional or supplemental properties, such as associated service control point call variables, node connection rules and node translation rules, can be added to the node library at a later time to completely characterize the meaning and intent of these operations at a particular services management system 14 and a particular service control point 17 (FIG. 1) in a generic manner. More particularly, a specific identification of the service implementing primitive in one or more service implementing network components which can be used to realize the node can be explicitly added to the node definition. The presence of such an identification of the actual code sequence in the service control point would substantially simplify the design of the interpretor program which translates the call processing record into actual service implementation. In this sense, the nodes become elements of an extendible, high level programming language for specifying telephone services.

In response to the NODE NAME prompt, the user supplies any unique name chosen for the new node. This name will hereafter be used to identify the node. This new node name can be thought of as a higher-level abstraction representing a specific operation using predefined call processing variables. Nodes can be either decision nodes or action nodes. The following node types, supplied in response to the NODE TYPE prompt, are possible:

TABLE 1

| NODE TYPES | |
|---|---|
| ACTION NODES | DECISION NODES |
| Assignment Action | Branch Decision |
| Boolean Operation Action | Integer Decision |
| Collect Action | Percent Decision |
| Connect Action | String Decision |
| Concatenate Action | |
| CPR Access Action | |
| Diagnostic Action | |
| Return Action | |
| Table Access Action | |
| Temporary Hand Over Action | |
| Terminate Action | |

The node type selected provides information that can be used during call processing record validation and call processing record code generation. These node types correspond to all of the basic types of actions and decisions that might be utilized in providing telephone special services. They are already programmed or programmable into prior art service implementing network components such as service control point 17. Should a new type of node be required, however, it is necessary to specify the new type, and to provide generic implementation of the activity of the new node type in the service control point 17.

The node types have particular meaning to service control point 17, which must execute the call processing record in real time. Specifically, the node type informs service control point 17 what functions or call primitives are to be invoked. These node types thus represent the "programmed capabilities" of service control point 17, which, when combined with the node name, representing a particular pre-defined call variable in the service control point call processing execution environment, enable service control point 17 to actually perform the requested operations using the correct data.

The DATA TYPE field specifies the format of the data that will be acceptable as input values for this node when this node is used in a call processing record. The data formats allowed are decimal numbers, alphanumeric text, telephone numbers, trunk identifiers, variable data, and billing information. The data type is used during call processing record validation at the time the call processing record is "provisioned" by the specification of customer-dependent data values.

To administer a call processing record, services management system 14 of FIG. 1 must be able to determine whether valid values have been entered for the nodes in the call processing record tree. Therefore the user must specify the rules to be used when validating the input values for this node when this node is used in a call processing record. In accordance with the present invention, a regular expression can be used to represent the validation rules. Moreover, such validation rules can be entered dynamically in the node definition as opposed to hard coding them in a program. For example, to specify the validations for a queuing node, the user can specify the regular expression " (lifo|fifo)$". This expression states that the node can accept either "last in, first out" or "first in, first out" queue behavior as input values.

In response to the OTHER ALLOWED, prompt, the user must specify whether the node can accept the word "other" as an input value. For example, if a day of the week node were defined and available for a particular service, a call processing record would be constructed with the day of the week node in the tree. If the input values for the day of the week node were specified as "Monday and Tuesday," then a second branch would need to be created to cover what should be done on Saturday, Sunday, Wednesday, Thursday and Friday. Rather than spell out the remaining days, the string "other" could be used. For some nodes "other" is not a sensible value. Therefore, during node definition, the user must indicate whether "other" is a valid input value or whether entering "other" should result in a validation error.

In response to the NODE ERROR MESSAGE prompt, the user enters a string to be printed when an inappropriate input value is specified for a node during the provisioning of a call processing record. This allows "on the fly" validation of data entries during all succeeding uses of this node definition.

The NOTES prompt permits a convenience field for the user. It can be used to note limitations on the node behavior, a general functional description of the node or any other information the user wishes to associate with the node definition.

Also shown at the top of screen 30 of FIG. 3 are a series of command light buttons labeled "Load," "Validate," "Store," "Delete," "Browse," "Help," and "Quit." These command buttons are operated, for example, by a mouse-driven cursor, to accomplish the associated screen display control functions. For example, "Load" will load any particular previously existing node definition (e.g., for editing) simply by giving the node name and evoking the "Load" command. Similarly, "Validate" performs the validation on the data entries made in response to the prompts. "Store" stores the newly defined node in the node library 12 of FIG. 1. The "Delete" command deletes the identified node definition from library 12. "Browse" allows the user to browse through all of the previously defined nodes, "Help" provides screens of useful ancillary information likely to be of assistance to the user during the node definition activity, and "Quit" allows the user to terminate the node definition activity. The implementation of these so-called "command buttons" are well-known in the art and will not be further described here.

Returning to FIG. 2, the second box 21 represents the activity of defining a new service in terms of previously defined nodes. In this context, a "record" is a service definition and box 21 includes "Load," "Validate" and "Store" commands for these service definition records. In addition, box 21 includes "Canvas" commands. These commands permit the visual and graphical manipulation of previously defined nodes into service definitions. As can be better seen in FIG. 4, the left half of the screen 40 is the drawing area where visual representations of previously defined nodes can be assembled into service definitions. The "Canvas" commands include "Clear" (to clear the canvas area), "Draw" (to prepare for manipulating items on the canvas), "Help" (to obtain screens of useful information to assist in the use of the system), and "Quit" (to terminate the service definition session). In addition, individual items in the canvas area can be manipulated with the commands "Select" (to select a particular node), "Add" (to add a selected note to the service definition), "View" (to view the node definition of the selected node), and "Delete" (to delete a node from the service definition).

The intended user of the service definition process is the service creator. This creator utilizes the service definition process to define the subset of nodes in the node library that are to be used in a specific service. The user is presented with the form shown in FIG. 4 which enables the user to specify the nodes from the node library that are allowed for use by a specific service with a certain qualifier. A qualifier could, for example, be a specific area of service in the service provider's territory. With the functions described above, the use of any particular node in a service can be defined by a service creator and administered by the service management system 14. Once the allowable node names for a particular service have been specified, using the screen 40 of FIG. 4, the user can store the service definition for the new service in service definition library 13 (FIG. 1). These service definitions can thereafter be edited, augmented or deleted from the service definition library 13 whenever desired.

The service creation user can distribute the node library and the service definition library in store 13 to the generic service management system 14 for use in administering the new service. Services management system 14 will permit the use of only the specified subset of nodes in all call processing records that are created and provisioned for this particular service. Additional properties, such as service-specific node connection rules and node translation rules, can be added to the service definition tables at this time to completely and generically characterize the meaning and intent of these operations for the service management system 14.

Figure 5:
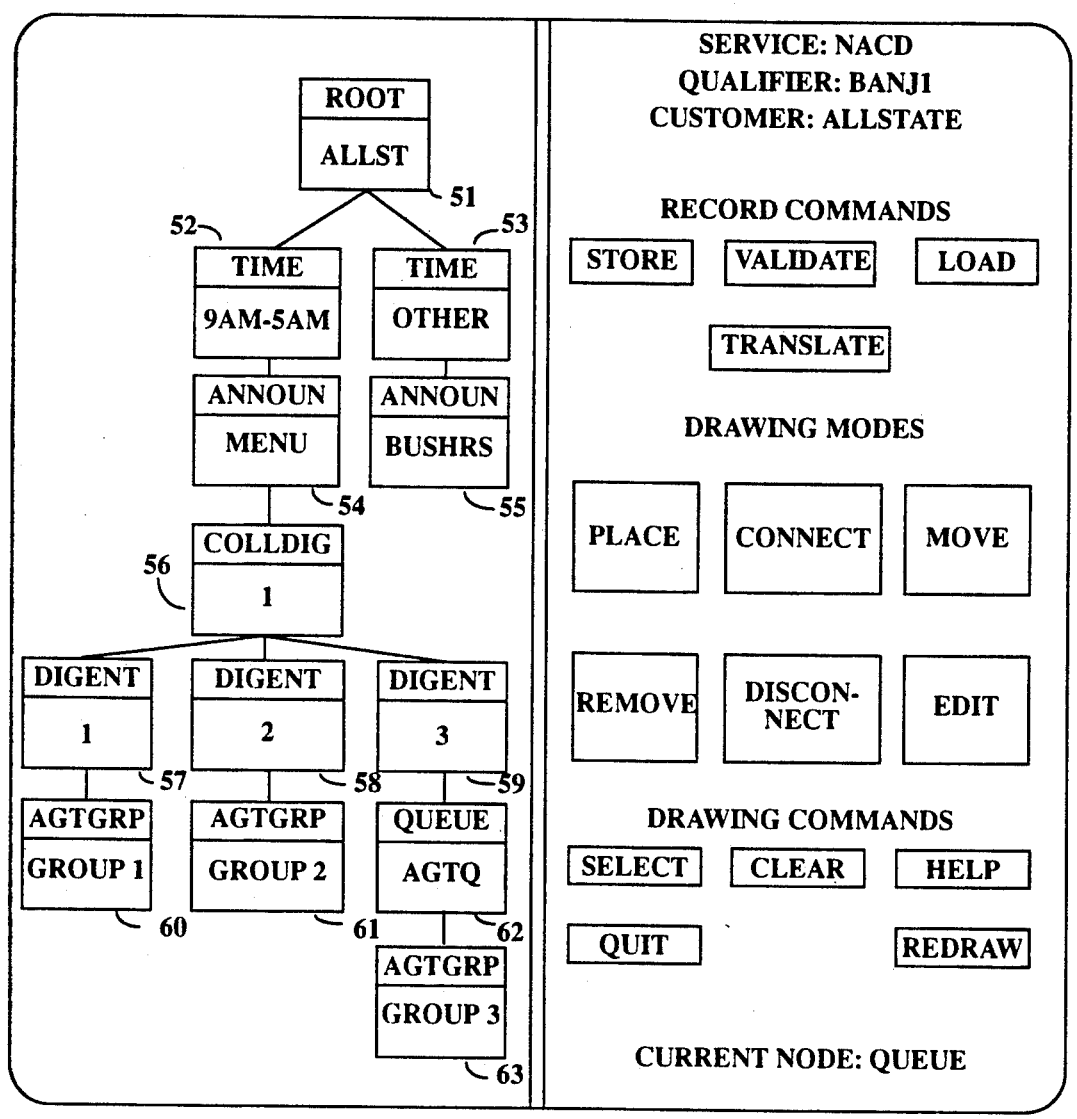
FIG. 5 is a graphical representation of a display screen used to customize a logical tree template of service primitives by specifying all of the customer-dependent variables required to implement a particular new service for a particular customer in the system of FIG. 1.

Returning to FIG. 2, the box 22 represents the procedures for "provisioning" the service defined in box 21. In this regard, the term "provisioning" means creating the logic tree representing the new service and customizing the defined service in terms of node parameter values. The screen 50 of FIG. 5 illustrates a mechanism for carrying out this process. The service creator can use this process to define a default representation of the service offering as a template of nodes interconnected in a call processing record tree format. The allowed nodes for a particular service are the ones specified through the service definition process. The service provisioning user can use this process to customize the default service template and to provision the service with node parameter values. The user is presented with the visual programming tool illustrated in FIG. 5 to enable a graphical, user-friendly specification and input of the appropriate service customization and provisioning information, based on service, qualifier and customer key information. The qualifier could be, for example, a specific area of service in the service provider's territory. The screen of FIG. 5 provides record manipulation functions (Load Record, Validate Record, Store Record, and Translate Record), node manipulation functions (Place, Connect, Move, Edit, Disconnect, and Remove), and draw commands (Select, Clear, Help, Quit, and Redraw).

With the above described functions, the user can define a service template of nodes interconnected in a call processing record tree format as a default representation of the service offering. Furthermore, the true power of the present invention becomes evident when it is realized that the service creator can define modular templates of common reusable node-based logic as service features, which can then be added to the node library as nodes for reuse by other features and services. In effect, the present invention provides a mechanism for using the set of "programmable capabilities" available at the service control point 17 and define reusable, user-friendly and high-level modules that enable easier and faster visual programming of the call processing logic.

It should be noted that assemblies of low level nodes can be associated together into a higher level capability which, once given a name, can be retrieved, manipulated and used in creating new services just like a low level node. In this way, as time proceeds, the creation of new services becomes easier and easier since ever higher levels of service primitives become available for assembly into the new services.

Once the default service template has been specified, the user can store the service template definition for the new service in service template definition store 19. The user can thereafter distribute these service template definition tables to the generic services management system 14 for use in administering the new service, providing a default service logic flow for the purpose of provisioning. Furthermore, the availability of service node definitions in store 13 will ensure that provisioning will support the use of only the creator-specified subset of nodes in any call processing records that are customized and provisioned for this particular service.

The service provider or the subscriber can also use the process illustrated in FIG. 5 to customize the default service template and to provision the service by providing node parameter values. At this stage, the node values supplied are validated dynamically by invoking the node validation rules specified for each node name in the node library. Additional node and service definition properties, such as node connection rules and node translation rules, can be specified to drive the validation and translation operations at the services management system 14 in a generic manner.

The attached Appendix provides pseudocode for implementing the flowchart of FIG. 2. With this pseudocode and the description herein provided, any person of ordinary skill in the programming art is able to fully implement the present invention.

It should also be clear to those skilled in the art that further embodiments of the present invention may be made by those skilled in the art without departing from the teachings of the present invention.

| APPENDIX |
| --- |
| Pseudocode |

Node Definition Process Pseudocode

```
invoke ('node_definition')
do until (invoke ('quit'))
  if (view (node_definition))
    then input (node_name)
      invoke ('load')
        if (node_definition (node_name) in library
          then
            retrieve (node_definition (node_name))
            display (node_definition (node_name))
          else
            create (node_definition_window (node_name))
            display (node_definition_window (node_name))
          endif
      end_invoke
  endif
  if (specify (node_properties))
    then
      set_default (field_values (node_name))
      enter (field_values (node_name))
    else
      if (modify (node_properties))
        then update (field_values (node_name))
      endif
  endif
  if (validation_check (node_name))
    then
      invoke ('validate')
        verify (node_name, field_entries, field_entry_
          combinations)
      end_invoke
  endif
  if (store (node_definition))
    then
      invoke ('store')
        retrieve (node_definition (node_name))
        overlay (node_definition, node_properties)
        store (overlay (node_name))
      end_invoke
  endif
  if (delete (node_definition))
    then
      invoke ('delete')
        retrieve (node_definition (node_name))
        delete (node_definition (node name))
      end_invoke
  endif
```

APPENDIX
Pseudocode

```
        if (browse (node_definition)
           then
              invoke ('browse')
                 display (node_properties)
                 retrieve (node_definitions)
                 display (node_definitions)
                 end_invoke
        endif
end_do
```

Service Definition Process Pseudocode

```
invoke ('service_definition')
do until (invoke ('quit'))
   if view (service_definition)
      then
         input (service_name, service_qualifier)
         invoke ('load')
            retrieve (service_definition (service_name, service_
               qualifier))
            display (node_name_list)
            end_invoke
   endif
   if view (all_nodes)
      then
         invoke ('select')
            generate (menu (all_nodes))
            end_invoke
   endif
   if (select_node)
      then
         invoke ('select')
            select (desired_node, menu (all_nodes))
            display (desired_node, current_node_display)
            end_invoke
   endif
   if use (current_node)
      then
         invoke ('add')
            position (current_node, canvas)
            add (current_node, service_definition)
            end_invoke
   endif
   if disallow (current_node)
      then
         invoke ('delect')
            select (current_node)
            delete (selected_node)
            end_invoke
   endif
   if view (current_node_definition)
      then
         invoke ('view')
            select (current_node)
            display (node_definition, current_node)
            end_invoke
   endif
   if validate (service_definition)
      then
         invoke ('validate')
            verify (field_entries, service_definition)
            verify (field_entry_combinations, service_definitions)
            end_invoke
   endif
   if store (service_definition)
      then
         invoke ('store')
            retrieve (service_definition (service_name, service_
               qualifier))
            overlay (service_definition (service_name, service_
               qualifer), canvas_nodes))
            store (service_definition (service_name, service_qualifier))
            end_invoke
   endif
   if clear (canvas_area)
      then
         invoke ('clear')
            clear (all_nodes, canvas_area)
            end_invoke
   endif
   if redraw (canvas_area)
      then
         invoke ('draw')
            clear (all_nodes, canvas_area)
            auto_invoke ('load')
            end_invoke
   endif
end_do
```

CPR Input Process Pseudocode

```
invoke ('CPR_input')
do until invoke ('quit')
   if view (existing_CPR_tree)
      then
         input (service_name, qualifier_name, customer_name)
         invoke ('load')
            retrieve (node_names (service_name, service_qualifier))
            retrieve (node_definitions (node_names)
            retrieve (CPR_tree (service_name, service_
               qualifier, customer_name))
            display CPR_tree (service_name, serice_qualifer,
               customer_name))
            end_invoke
   endif
   if view (allowed_nodes (service_name, service_qualifier))
      then
         invoke ('select')
            generate (menu (allowed_node_names))
            end_invoke
   endif
   if select (allowed_node)
      then
         invoke ('select')
            identify (desired_node)
            display (desired_node, current_node)
            end_invoke
   endif
   if add (current_code, CPR_canvas)
      then
         invoke ('place')
            position (current_node, CPR_canvas)
            place (current_node, CPR_canvas)
            end_invoke
   endif
   if connect (node_name1, node_name2, CPR_canvas)
      then
         invoke (connect)
            select (from_node)
            select (to_node)
            draw_line (from_node, to_node)
            end_invoke
   endif
   if move (node_name)
      then
         invoke (move)
            erase (node_name, old_location
            redraw (connections, old_location, new_location)
            end_invoke
   endif
   if edit (node_name_node_value)
      then
         invoke ('edit')
            select (node_name)
            display (edit_menu)
            input (node_value)
            invoke ('enter')
               erase (old_value)
               display (new_value)
               end_invoke
            end_invoke
   endif
   if disconnect (node_name)
      then
         invoke ('disconnect')
            select (node_name)
            erase_connection (node_name, node_parent)
            end_invoke
   endif
   if remove (node_name)
      then
         invoke ('remove')
```

APPENDIX
Pseudocode

```
            select (node_name)
            remove (node_name, children, connections)
        end_invoke
    endif
    if validate (CPR_node)
        then
            invoke ('validate')
                for (each node in CPR_tree)
                do
                    validate (node_value, node_rule)
                end_do
                display (error_messages)
                correct (node_values, connections)
            end_invoke
    endif
    if store (CPR_tree)
        then
            invoke ('store')
                retrieve (CPR_tree (service_name, service_qualifier,
                    customer_name))
                overlay (CPR_tree (service_name, service_qualifier,
                    customer_name), CPR_tree (canvas_area))
                store (CPR_tree, overlay)
            end_invoke
    endif
    if clear (canvas_area)
        then
            invoke ('clear')
                erase (canvas_area)
            end_invoke
    endif
    if redraw (canvas_area)
        then
            invoke ('redraw')
                erase (canvas_area)
                auto_invoke ('load')
            end_invoke
    endif
end_do
```

What is claimed is:

1. A method for visually programming telephone services for implementation in a telephone network having a service control point, said method comprising the steps of defining new nodes of network service primitives for storage in a storage means, recalling from said storage means previously defined nodes, assembling a set of said defined new nodes and recalled nodes to be used in one of said telephone services wherein said assembled set of nodes can be stored as a service definition in a service definition library, graphically interrelating said assembled nodes into a logical graph representing a telephone service call processing sequence, storing said logical graph in a logical graph template library within said storage means to be used in providing the defined telephone service, retrieving a logical graph template from said template library when said telephone service is to be provisioned for a customer, and specifying customer dependent variables in said logical graph template for provisioning customer service wherein said logical graph template with said specified customer dependent variables can be sent to a service control point for interpretation by an interpretive process to provide service.

2. The method according to claim 1 wherein said step of defining new nodes comprises the step of
specifying the name of one of said new nodes.

3. The method according to claim 2 wherein said step of defining new nodes comprises the step of
specifying the node type of said one new node.

4. The method according to claim 2 wherein said step of defining new nodes comprises the step of
specifying the data type of parameter values associated with said one new node.

5. The method according to claim 4 wherein said step of defining new nodes further comprises the steps of
specifying validation rules for parameter values associated with said one new node, and
specifying an error message to be displayed in response to the failure of either said data type or said parameter values to satisfy said validation rules.

6. The method according to claim 1 wherein said step of defining new nodes comprises the step of
displaying selected ones of the defined new nodes.

7. The method according to claim 1 wherein said step of graphically interrelating includes the step of
adding either a new or previously defined node to said call processing sequence.

8. The method according to claim 1 wherein said step of graphically interrelating includes the step of
deleting either a new or previously defined node from said call processing sequence.

9. The method according to claim 1 wherein said step of graphically interrelating includes the step of
interconnecting two of said set of assembled nodes in said call processing sequence.

10. The method according to claim 1 wherein said storage means comprises:
a node library for storing said new and previously defined nodes, said service definition library and said template library.

11. The method according to claim 1 wherein said logical graph can be defined as a complex node and stored for later use and recall in said node library.

12. A system for defining software implemented services in a telephone network having a service control point and programmable facilities of having executable service primitives, said system comprising:
a node data store for storing groupings of said service primitives as primitive nodes;
a service definition data store;
a call processing record template store;
a graphical user input and display device; and
service creation process means for retrieving from said node data store any number of said nodes and displaying said nodes on said graphical user input and display device as a graphical symbol wherein a user using said graphical user display device can select from said nodes a set for defining a service and store said set of nodes together as a service definition in said service definition data store, manipulate said set of nodes into a graphical abstraction of a logical service process, and store said graphical abstraction of a logical service process as a call processing record in said call processing record template store, and wherein customer data can be added to said call processing record template store and sent to said service control point to provision services for a customer.

13. The system according to claim 12 wherein said service creation process means further comprises means for defining at least one new node of service primitives by specifying a node name, a node type, and a new set of node properties comprised of parameter values and means for storing said new node in said node data store.

14. The system according to claim 13 wherein said service creation process means further comprises means for modifying said nodes by changing the values for properties that make up said nodes.

15. A system for defining software implemented services in a telephone network having programmable facilities consisting of executable service primitives, said system comprising:
a node data store for storing groupings of said service primitives as primitive nodes;
a service definition data store;
a call processing record store;
a graphical user input and display device; and
service creation process means for retrieving from said node data store any number of said nodes and displaying said nodes on said graphical user input and display device as a graphical symbol, said service creation process means comprising:
means for defining at least one new node of service primitives by specifying a node name, a node type, and a new set of node properties comprised of parameter values said means for defining at least one new node further comprising;

means for specifying an error message to be displayed in response to the failure of either said node type or said parameter values to satisfy validation rules; and
means for storing said new node in said node data store,
wherein a user using said graphical user display device can select from said nodes a set for defining a service and store said selected set of nodes defined as a service in said service definition data store, manipulate said set of nodes into a graphical abstraction of a logical service process creating a call processing record logic tree and store said call processing record logic tree in said call processing record data store, and wherein said user can add to said graphical abstraction of a logical service process customer data creating a customized call processing record to be sent to a service control point to be executed when service is requested.

16. The system according to claim 15 wherein said service creation process means further includes means for adding a node from said node data store to said call processing record logic tree.

17. The system according to claim 16 wherein said service creation process means further includes means for deleting a node from said call processing record logic tree.

* * * * *